W. P. SHOMAKER.
STEERING APPARATUS ATTACHMENT.
APPLICATION FILED SEPT. 15, 1921.
1,435,423.                                        Patented Nov. 14, 1922.
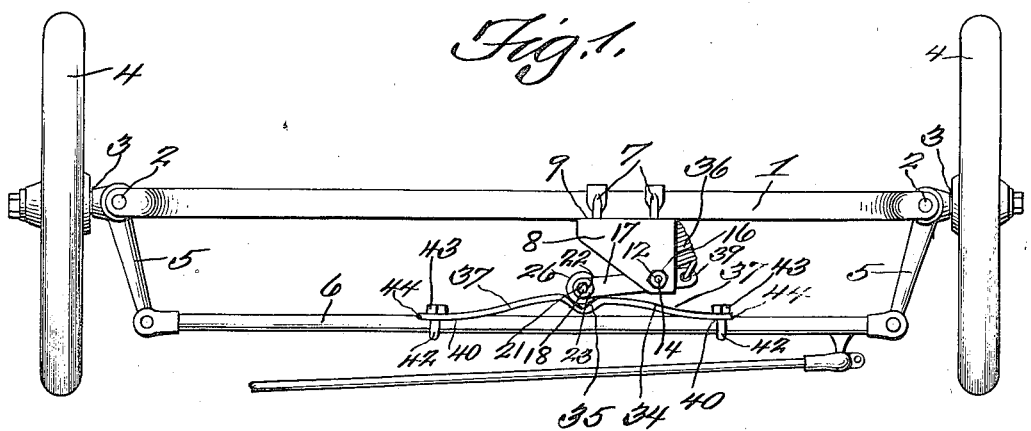
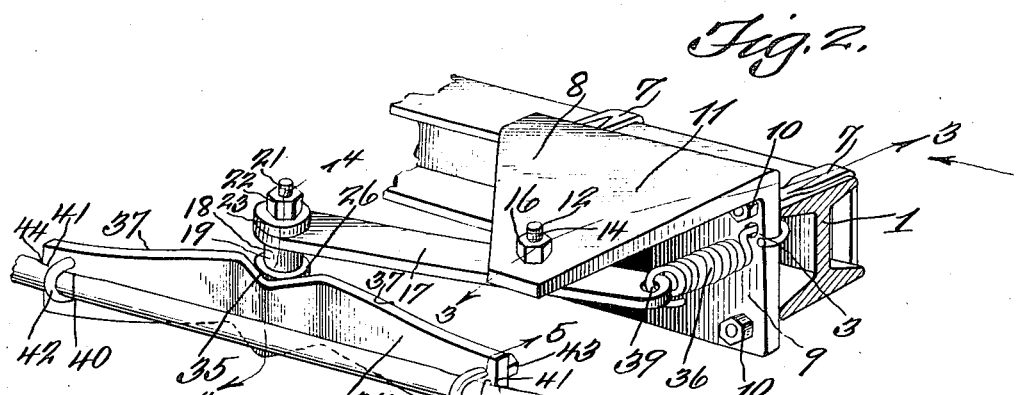
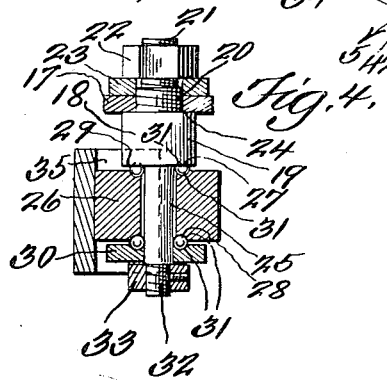
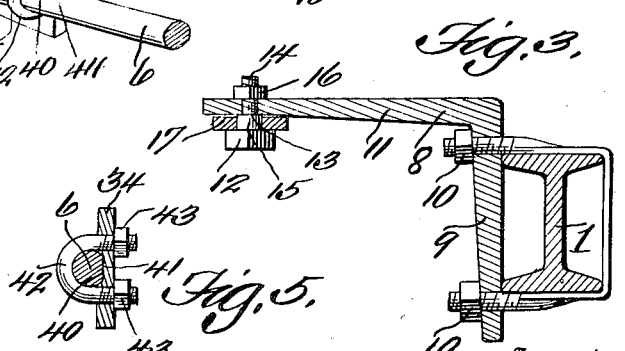
Inventor
Wesley P. Shomaker,
By R. A. Boswell
his Attorney Patented Nov. 14, 1922.

1,435,423

UNITED STATES PATENT OFFICE.

WESLEY P. SHOMAKER, OF RICHMOND, VIRGINIA.

STEERING APPARATUS ATTACHMENT.

Application filed September 15, 1921. Serial No. 500,960.

*To all whom it may concern:*

Be it known that WESLEY P. SHOMAKER, a citizen of the United States of America, residing at Richmond, county of Henrico, State of Virginia, has invented a new and useful Steering Apparatus Attachment, of which the following is a specification.

It is well known that in steering automobiles, the irregularities in the road bed cause the front wheels to vibrate in lateral directions, and it is obvious that these lateral vibrations are transmitted to the steering wheel, through the medium of the connections between the front wheels and the steering column. Very often the irregularities in the road bed act to vibrate the front wheels to such an extent as to swing the automobile considerable to one side and thereby cause accidents, particularly if the automobile is approaching a precipice or an embankment on either or both sides of the road bed. Also the vibrations transmitted to the steering wheel are annoying, and also cause the parts to become loose in time.

Now the purpose of the present invention is to provide an improved means operatively connecting between the axle and the knuckle connecting rod of the front wheels, so as to hold the front wheels steadily straight ahead, especially when traveling on a straight road, and thereby relieving the vibrations on the steering wheel.

Another purpose is that by the provision of a device of this kind, there is no need for the chauffeur to retain the hands firmly on the steering wheel at all times, in fact one hand may be removed entirely, while the other may be retained loosely in engagement with the wheel. Very often both hands may be removed, and yet the front wheels will remain traveling straight ahead.

Still another purpose is the provision of a device of this kind which is very simple, efficient and practical in construction, and will not interfere in any way with the proper steering of the front wheels, in case it is necessary to make a turn either to the right or the left. Furthermore the present invention will transfer all lost motion of the steering gear to the steering wheel and hold the front wheels rigid, and at the same time will remove the rattle in the knuckle connecting rod, and also take the vibration off the chauffeur's arms.

A further purpose is that a device of the present character is very easy to attach to any make of automobile, and furthermore the cooperating parts of the attachment may automatically come in gear as soon as the front wheels are moved to travel straight ahead.

A still further purpose is the provision of a device of this kind wherein a yieldable plate is carried by the knuckle connecting rod including a notch or recess therein, in combination with a yieldably mounted lever mounted upon the front axle and including a roller to engage said notch, so that as long as the front wheels are arranged to travel straight ahead the roller and the notch of the spring plate will remain constantly in engagement and retain the front wheels as traveling straight ahead.

Additionally the invention aims to provide a mounting for the lever carrying the roller, and an efficient construction of mounting for holding the spring plate on the knuckle connecting rod, so that when the knuckle connecting rod moves to the right or the left the spring plate will yield slightly together with the yielding action of the lever carrying the roller, so that the roller may move to one side or the other of the notch, and permit the front wheels to turn in either direction.

While the design and construction at present illustrated and set forth are deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a plan view of the front axle of an automobile and the knuckle connecting rod for the front wheels, showing the improved steering apparatus attachment applied and constructed in accordance with the invention;

Figure 2 is an enlarged detail perspective view of the attachment, showing more clearly the construction and arrangement and mounting of the parts;

Figure 3 is a cross sectional view on line 3—3 of Figure 2;

Figure 4 is a sectional view on line 4—4 of Figure 2;

Figure 5 is a sectional view on line 5—5 of Figure 2.

Referring to the drawings, 1 designates the front axle of an automobile, which is provided with the usual knuckle joints 2 with the spindles 3, on which the front wheels of the automobile are mounted.

The knuckle joints include the usual projecting steering arms 5, which are connected by the knuckle connecting rod 6. It is obvious that the arms 5 may extend forwardly or rearwardly, and the connecting rod 6 may be correspondingly disposed.

Carried by and secured to the front axle by means of staples 7 is a right angle supporting bracket 8, through the depending flange 9 of which, the arms of the staples 7 engage, so that the nuts 10 may be threaded upon the arms to hold the angle supporting bracket securely and rigidly in position.

It will be noted that the angle supporting bracket is relatively thick where its horizontal flange 11 unites with the depending flange 9. A suitable bearing bolt 12 engages through the horizontal flange 11 of the supporting bracket, so that the shoulder 13 between the threaded reduced part 14 and the cylindrical bearing 15, may be drawn tight against the under surface of the flange 11, by tightening up upon the nut 16. A lever 17 swings upon the bearing 15 loosely, and carried by the end of the longer arm of said lever is a roller supporting pin or journal 18. This pin or journal 18 comprises a cylindrical body 19 which has a reduced extension 20. This extension 20 also has a reduced portion 21, which carries a threaded nut 22. A washer 23 is located between the end of the lever 17 and the nut, and by tightening up upon the nut, the shoulder 24 between the reduced extension 20 and the body 19 may be drawn tight against the under surface of the lever and hold the journal or pin rigidly in position and against turning. In fact the reduced extension 20 is threaded into the end of the lever 17, so that together with the nut 22, it is assured that the pin or journal may remain rigid relatively to the lever 17.

The journal or pin 18 has a depending reduced journal extension 25, on which a roller 26 is mounted, there being ball bearings 27 and 28. The ball bearings 27 are located between the shoulder 29 and the roller, while the ball bearings 28 are located between the roller and the washer 30, which is fitted upon the journal extension 25. The ball bearings engage suitable raceways 31 of these corresponding parts, so that the roller will freely rotate. The extension 25 is additionally reduced as at 32, and threaded upon this second reduced portion is a nut 33, for holding the washer 30 in place on the journal extension.

A spring wear and guide plate 34 is carried by the knuckle connecting rod 6 to be engaged by the roller 26. The spring plate 34 is of the general shape shown in Figure 1, therefore sprung away from the connecting rod 6, so that its central portion may have a certain amount of yielding movement toward and from the connecting rod 6. The central portion of this spring plate has substantially a V-shaped notch or recess 35, in which the roller 26 normally engages, when the front steering wheels 4 are traveling straight ahead. However when it is desired to turn the front wheels to the right or the left, for making a decided turn to the right or the left, sufficient pressure is applied to the steering wheel, so as to overcome the tension of the spring plate 34 and the tension coil spring 36 (which holds the lever so that its roller will engage the recess or notch), thereby permitting the roller to roll upon the forward diverging surfaces 37 of the spring plate, it depending on the direction the front wheels are turned. As soon as sufficient force is applied to the steering wheel to disengage the roller from the notch, the front wheels may be turned in either direction with as much ease, as without the attachment applied. It will be noted that the end portions of the spring plate beyond the notch 35 diverge laterally and rearwardly, so as to hold the back of the notch away from the connecting rod, thereby permitting a certain amount of the resiliency of the plate to hold the notch in engagement with the wheel. Furthermore the connecting rod is capable of yielding to a certain degree so as to insure a yieldable connection between the roller 26 and the notch. The tension coil spring connects at 38 with the depending flange of the supporting bracket, and in turn connects at 39 with the end of the short arm of the lever 17, and exerts sufficient tension on the lever to hold the roller 26 at all times in engagement with the notch 35 when the front wheels are traveling straight ahead. The act of the roller 26 engaging the notch 35 holds the front wheels steady, and absorbs the rattle in the connecting rod, and relieves the vibration on the steering wheel and the chauffeur's arms and hands.

In order to hold the spring plate in position and from moving longitudinally of the rod 6, as well as from rotating, the connecting rod 6 is slightly flattened as at 40, with which the flattened portions 41 of the ends of the plate 34 engage, thereby preventing rotation of the plate relatively to the rod. Suitable staples 42 straddle the connecting rod and have their arms engaging through the plate, whereby suitable nuts 43 may be threaded thereon to draw the staples securely in position and tighten the spring plate 34 securely to the rod. It will be noted that at the ends of the flattened portions 40 of the rods, shoulders 44 are caused to be formed, thereby preventing endwise movement of the spring plate.

The invention having been set forth, what is claimed as being useful is:

1. In a steering apparatus attachment, the combination with a front axle provided with front wheels, of a knuckle connecting rod operatively connecting the front wheels, a spring plate carried by the connecting rod and provided with a central notch, a lever pivotally supported upon the front axle and having a freely rotating roller to engage said notch, and a tension coil spring connecting one end of the lever and a stationary part for holding the roller constantly in engagement with the notch for holding the front wheels as traveling straight ahead.

2. In a steering apparatus attachment, a front axle, a support mounted thereon, a lever pivotally mounted on the support and provided with a roller at one end, a knuckle connecting rod, a spring plate carried thereby and provided with a central notch with which said roller engages, and spring means urging tension on the lever to hold the roller constantly in engagement with the notch, as long as the front wheels of the automobile travel straight ahead.

3. In a steering apparatus attachment for automobiles, a front axle provided with front wheels, a knuckle connecting rod operatively connecting said front wheels, a support on the axle, a lever pivotally mounted on said support, a spring plate fixedly connected to the connecting rod and provided with a central notch, a freely rotating roller on one end of the lever and operatively engaging said notch to hold the front wheels ahead, and a coil tension spring connecting said support and one arm of said lever to retain the wheel in the notch.

4. In a steering apparatus attachment for automobiles, a front axle provided with front wheels, a knuckle connecting rod operatively connecting said front wheels, a support on the axle, a lever pivotally mounted on said support, a spring plate fixedly connected to the connecting rod and provided with a central notch, a freely rotating roller on one end of the lever and operatively engaging said notch to hold the front wheels straight ahead, and a coil tension spring connecting said support and one arm of said lever to retain the wheel in the notch, means for preventing longitudinal and rotating movement of the spring plate relatively to the knuckle connecting rod.

5. In a steering apparatus attachment, a front axle provided with knuckle joints for front wheels, a cross connecting rod operatively connecting with said knuckles, a plate, and means to hold said plate on the connecting rod, whereby it is prevented from moving longitudinally and rotatably of the rod, said plate having its central portion yieldable toward and from the rod and provided with a central notch, an angle support mounted on the axle, a lever loosely and pivotally mounted on said support and comprising long and short arms, a freely rotatable roller mounted on the long arm and engageable with said notch, and means operatively connecting said support and the short arm of the lever to hold the roller constantly in engagement with the notch and maintaining the front wheels as traveling straight ahead.

In witness whereof, in the presence of two witnesses, the inventor's signature is hereunto affixed.

WESLEY P. SHOMAKER.

Witnesses:
JAMES T. LEWIS,
R. DIXON POWERS.